United States Patent

McKinley et al.

[11] 4,241,102
[45] Dec. 23, 1980

[54] APPARATUS AND METHOD FOR THE SELECTIVE WETTING OF PARTICLES

[75] Inventors: John R. McKinley, Claremont; John G. Roeschlaub, Upland, both of Calif.

[73] Assignee: Occidental Research Corporation, Irvine, Calif.

[21] Appl. No.: 45,186

[22] Filed: Jun. 4, 1979

[51] Int. Cl.² .................. B05B 13/02; B05C 3/08; B05D 1/02
[52] U.S. Cl. ..................... 209/3.1; 118/57; 118/303; 118/304; 118/417; 118/425; 209/3.3; 427/54.1; 427/157; 427/242; 427/346
[58] Field of Search .............. 118/13, 19, 22, 57, 118/303, 300, 304, 400, 417, 423, 425; 209/3.1, 3.3; 427/3, 212, 242, 157, 54, 346

[56] References Cited

U.S. PATENT DOCUMENTS

| | | |
|---|---|---|
| 2,967,614 | 6/1959 | Nury et al. |
| 3,045,640 | 7/1962 | Hill et al. ................... 118/304 X |
| 3,346,111 | 10/1967 | Thompson et al. |
| 3,356,211 | 12/1967 | Mathews |
| 3,400,011 | 9/1968 | Fox |
| 3,477,842 | 11/1969 | Cook et al. |
| 3,734,287 | 5/1973 | Pearman ..................... 209/467 |
| 3,901,793 | 8/1975 | Buchot et al. |
| 3,992,287 | 11/1976 | Rhys ........................ 209/3.1 |
| 4,116,163 | 9/1978 | Torelli et al. ............... 118/303 |

Primary Examiner—Morris Kaplan
Attorney, Agent, or Firm—Barry A. Bisson

[57] ABSTRACT

Apparatus and a method for the selective conditioning, wetting and coating of particles with a selective wetting agent. The apparatus includes a horizontally extending surface capable of vibration which vibration induces uniform translatory movement along the surface to particles upon the surface. A vertically extending barrier is on the surface and extends across the surface and at right angle to the direction of movement of particles upon the surface. A means for spraying the selective wetting agent onto the particles as they move along the surface and before they reach the barrier is provided. Means for removing excess wetting agent are provided on the surface along the direction of movement of the particles after the barrier. A pool of the selective wetting agent forms behind the barrier upon the surface.

12 Claims, 2 Drawing Figures

APPARATUS AND METHOD FOR THE SELECTIVE WETTING OF PARTICLES

BACKGROUND OF THE INVENTION

The present invention relates to apparatus and method for the selective wetting of a mixture of particles with a selective wetting agent, such as a surface-active agent. More particularly, this invention relates to an apparatus and method for selectively wetting select particles of a mixture of particles with a surface-active agent whereby particles are selectively wetted (coated) with the surface-active agent in an amount relative to the amount of a selected component within the particles with which the surface-active reagent is reactive. The particles containing such a selected component are coated with the surface-active agent in amounts dependent upon the amount of selected component to the substantial exclusion of coating the particles containing essentially none of the component.

Selective wetting of particles is required for many operations for separating a mixture of particles. In particular, the selective wetting of particles is practiced in the mining and ore beneficiating art for separating minerals from the ore in which it is contained. Some methods used to separate a mineral from other components within a mineral ore rely upon the differences in the surface chemical properties of the components in the ore. The surface chemical properties of a particle of ore depend upon components present in that particle of ore. As the particles contain varying compositions, the particles can be distinguished and thereby separated according to their composition through use of the surface chemical properties of the individual particles.

In order to make use of the differences in the surface chemical properties of the particles of ore, it is often necessary to contact the mixture of particles with a surface-active agent that will selectively react with some of the particles due to the selectivity of the agent in distinguishing between surface chemical properties. "Reaction" may be chemical, physical or a hybrid of the two. The process of contacting a mixture of particles with a surface-active agent is referred to in the art as "conditioning." Methods of particle separation in which it is necessary to condition the particles include methods such as flotation separation and optical separation. In flotation separation the particles to be separated are conditioned with a flotation agent. The flotation agent coats the ore particles with which it is reactive either with a coating which makes the particles float or with a coating which suppresses flotation while other particles are floated. For example, some flotation agents impart a hydrophobic coating to particles which coating assists in floating the particles to enable separation.

In an optical separation process such as a fluorescent separation method, a mixture of particles to be separated is conditioned with an aqueous dispersion of a suitable surface-active agent and a fluorescent material, e.g., a dye. The selectively coated particles exhibit fluorescence when exposed to actinic radiation, such as ultraviolet light. The particles which are poorly coated with the surface-active agent and fluorescent dye combination do not exhibit significant fluorescence when exposed to actinic radiation. Based on the difference in fluorescence, coated particles can be separated from those which are poorly coated in an apparatus as described in Mathews U.S. Pat. Nos. 3,472,375; 3,356,211; and 3,722,676, all of which are incorporated herein by this reference.

Methods currently employed for conditioning particles generally consist of either one of two conditioning methods. One current method practiced is immersing the mixture of particles to be separated in a fluid bed containing the surface-active agent. A disadvantage of such a method is that a large reservoir of the surface-active agent must be maintained in order to continuously wet the mixture of particles as the particles move through the fluid bed. Another disadvantage of such a method is that the particles may not be coated on their surface which is in contact with the transfer device conveying the particles through the fluid bed. This partial coating of the particles can inhibit the efficient separation of the particles from the mixture. For example, if an optical separation technique is employed wherein the residence time for a particle in a detection zone is relatively short, the non-coated surface of a particle can be presented to the detection means. The particle that is only partially coated can, therefore, be undetected resulting in inefficient separation. In the flotation separation process, if a surface of a particle is not coated with the flotation agent, the particle may not acquire the necessary change in surface hydrophobicity to bring about flotation or suppression of that particle. Therefore, such a particle can escape separation.

A second method of wetting a mixture of particles is by spraying the surface-active agent onto the mixture of particles as the particles are transported on a moving belt or a vibrating screen by the sprayer. In this method of wetting the particles there exists the possibility that the particles will be nonuniformly coated. The surface of the particles that are in contact with the belt may not be coated. Even if the belt were vibrating some surface on the particles may not be coated by the sprayer. As the particles are also in contact with a surface, there can be smearing of the surface-active agent on the particle and on the particles that are not normally surface-chemically-active with the reagent. Thus, separation based upon the coating imparted to the particles can be inefficient.

SUMMARY OF THE INVENTION

In accordance with this invention, there is disclosed apparatus and a method for the selective wetting of particles within a mixture which mixture contains particles that are receptive and particles that are nonreceptive to the activity of a selective surface agent. The surface-active agent selectively coats those particles with which it is surface chemically reactive to the substantial exclusion of coating the particles with which it is substantially surface chemically inactive. The surface-active agent is reactive with a selected component in the particles and coats the particles containing such selected component in an amount relative to the amount of selected component in each particle. The surface-active agent coated particles are then separated into fractions depending upon the amount of coating on the particles.

The apparatus for wetting the particles to be treated with the surface-active agent comprises a flat horizontally extending surface capable of being vibrated wherein the the vibratory action of the surface imparts translatory movement to particles deposited upon the surface. The translatory movement is in one direction along the length of the surface. Positioned upon the surface in the direction of movement of the particles is a barrier. Means for imparting vibratory motion to the surface is provided.

Positioned above the surface at a location along the direction of movement of particles on the surface and before the barrier is a sprayer directed toward the surface for dispensing surface-active agent onto particles upon the surface. A pool of the surface-active agent forms upon the surface behind the barrier as a result of a damming action provided by the barrier. On the side of the barrier opposite the pool of surface-active agent, and still along the direction of movement of particles along the surface, is a screen or perforated surface. The screen or perforated surface also vibrates propelling particles along its surface in the general direction of the movement of the particles on the surface. Positioned below the screen or perforated surface is a conditioning agent (wetting agent) receiver for receiving excess conditioning agent falling through the screen or perforations from conditioned particles. The conditioning agent receiver is in fluid communication with a conditioning agent collector for collecting the conditioning agent that falls from the particles on the vibrating screen or perforated surface.

The method of wetting particles with a selective surface-active agent comprises depositing particles to be wetted onto a horizontally extending surface capable of vibration. The surface is vibrated for inducing translatory movement to the particles such that the particles move along the length of the surface. As the particles move along the surface, they are sprayed with the selective surface-active agent from a spray directed toward the surface and particles thereupon. A pool of the surface-active agent forms upon the surface behind a provided barrier which extends across the surface at right angle to the direction of movement of the particles. The particles move through the spray and pool of surface-active agent and are wetted by the surface-active agent which forms a coating on the particles. The vibrating action of the surface moves the particles over the barrier and onto a screen or perforated surface which also vibrates. Excess surface-active agent on the particles is removed from the particles and falls through the screen or perforated surface and is collected. Such collected surface-active agent can be recycled for use in spraying on the particles or for forming the pool of surface-active agent upon the surface.

In a particular application, the apparatus and method herein have utility within an optical separation process wherein a mixture of particles containing varying amounts of a selected component are conditioned with a selective surface-active agent in combination with a fluorescent dye for imparting a coating on those particles containing the selected component. The coating imparted comprises the selected surface-active agent in combination with the fluorescent dye. The amount of coating on each particle is dependent upon and relative to the amount of selected component in each particle. The conditioned particles are then irradiated with actinic irradiation to excite and induce fluorescence of the fluorescent dye. The intensity of the fluorescent dye on each particle is monitored by a monitoring device which is capable of activating a deflector. Based upon the intensity of fluorescence exhibited by a particle, the particle is deflected from its initial path of travel or is allowed to continue in the direction of its initial path of travel. Additional deflectors can be positioned along the path of travel of the particles to enable the separation of the initial mixture of particles into more than two fractions.

BRIEF DESCRIPTION OF THE DRAWINGS

These and other aspects of this invention will be more fully understood by reference to the following detailed description and accompanying drawings wherein.

DETAILED DESCRIPTION OF THE INVENTION

According to the present invention, there is provided apparatus for the selective wetting of a mixture of particles with a wetting agent, such as a surface-active agent and a method of selectively wetting a mixture of particles. The term "wetting agent" is used herein to include all reagents which selectively coat a particle or selected component within a particle to the substantial exclusion of coating other particles or other components within a particle. Such a wetting agent can be a selective surface-active agent which interacts with the surface chemical properties of the particle. The apparatus and practice of the method of this invention can be used in combination with apparatus and the practice of other processes wherein it is necessary or desirable to wet a particular particle within or undergoing such other process. For example, the apparatus and method can be used in a process for the optical separation of a mixture of particles based upon fluorescence or a separation process based upon flotation.

Figure 1:
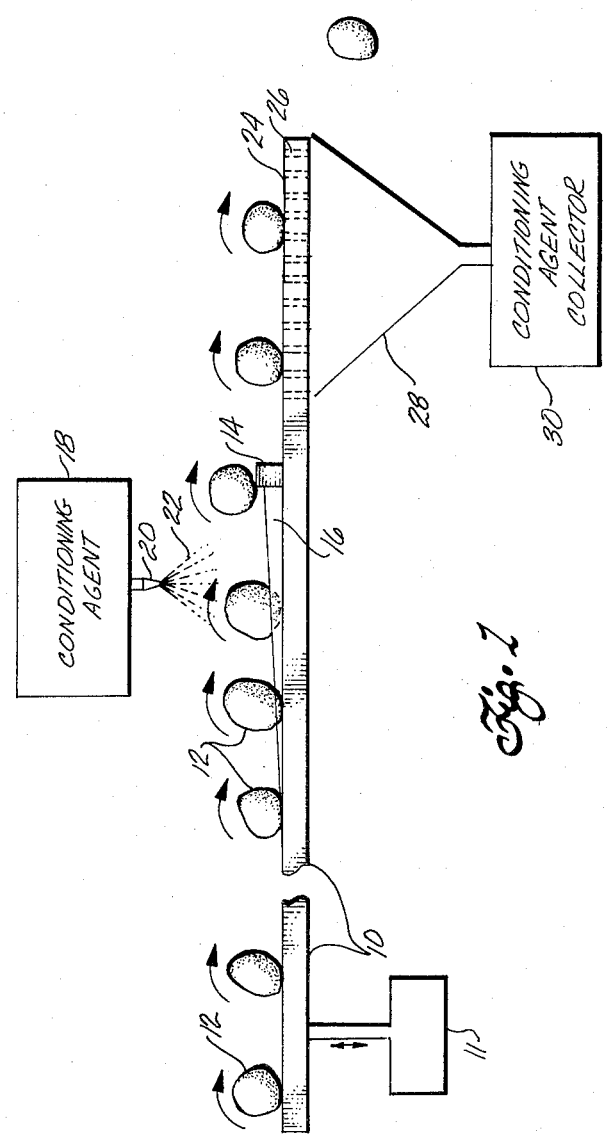
FIG. 1 schematically illustrates an embodiment of apparatus for conducting the method herein disclosed of selectively wetting particles within a mixture with a selective surface-active agent.

With reference to FIG. 1 the apparatus for wetting particles comprises a substantially planar surface 10. The surface 10 extends horizontally and is provided with vibrating means 11 for vibrating the surface in such a manner that particles upon the surface 10 travel in a uniform direction along the length of the vibrating surface. The means for vibrating the surface can be any vibrational inducing mechanism, many of which are known in the vibrational imparting art. For example, a mechanism having a reciprocating arm and an actuation motor for the arm can be used. The surface is a solid material and can be made from materials such as metals, metal alloys, coated metals, rubber, wood, plastic and the like.

A particle 12 to be wetted with a wetting agent is deposited upon the surface 10. The vibrational means 11 is activated and the surface is vibrated. The vibrating action of the vibrating surface imparts a translatory movement to the particle. The vibration also causes the particles 12 to move in a rotational manner along the vibrating surface 10. The path of travel of the particles 12 along the surface is in a generally uniform, longitudinal direction along the surface 10. Positioned along the direction of movement of the particles and upon the surface 10 is a vertically extending barrier 14. The barrier 14 extends across the surface 10 at right angle to the direction of movement of the particles. The barrier 14 is attached to the vibrating surface 10 in such a manner that the barrier forms a seal with the surface to prevent the flow of fluid between the barrier 14 and the surface 10. The barrier also inhibits the flow of fluid along the surface 10.

The barrier 14 has a height above the surface 10 to enable the formation of a pool 16 of liquid on the side of the barrier opposite the direction of movement of particles on the surface of the vibrating surface 10. For an apparatus designed for use in an optical separation technique wherein the particles to be separated are of a size from about ¼ inch to about 8 inches, the barrier 14 has a height at least about ¼ inch and generally from about ¼ inch to about 4 inches. A height of less than ¼ inch can be used but generally does not provide a pool depth of significant interest as will be described hereinafter. A height of greater than 4 inches can be used but such a height increases the obstruction of the movement of the particles themselves over the barrier. Preferably the height of the barrier is between about ½ to about 1½ inches. A particularly preferred height for the barrier 14 is about ½ inch. Such a height enables the formation of a liquid pool 16 of substantial depth to enable wetting of a particle within the pool and still permit the particle to readily travel over the barrier. Such a height of the barrier does not to any appreciable extent hinder the travel of a particle along the vibrating surface 10. A preferred height, in general terms for the barrier 14, is a height that enables the formation of a pool of the wetting agent while concomitantly allowing movement of the particles across the barrier.

The pool 16 of liquid formed on the upstream side of the barrier 14 is a pool of the wetting agent or conditioning agent. For example, in a process for the optical separation of a mixture of particles, a conditioning agent which is a selective surface-active agent forms such a pool 16 upstream of the barrier 14. The term "upstream" is used sometimes hereinafter to refer to the direction along the surface 10 opposite the direction of movement of particles 12 upon the surface. The term "downstream" is used sometimes hereinafter to refer to the direction along the surface 10 which corresponds to the direction of movement of particles 12 upon the surface.

The pool 16 of the wetting agent to be coated on the particles 12 can be formed in whole or in part by spraying the particles 12 with the conditioning agent as they travel along the surface 10. A wetting agent (conditioning agent) to be coated onto the particles is stored in a conditioning agent reservoir 18 positioned above and along the surface 10. The reservoir 18 is provided with a spray nozzle 20 for delivering a spray 22 of the wetting agent onto particles 12 as they travel along the vibrating surface 10. Excess wetting agent not coating the particles 12 forms or is collected in a pool 16 upstream of the barrier 14. The pool 16 of wetting agent can also be formed by introducing wetting agent or a recycled wetting agent onto the surface 10.

In addition to being sprayed with the wetting agent spray 22, the particles 12 encounter the pool 16 of wetting agent as they move along the vibrating surface 10. The particles become coated with the wetting agent from the pool 16 and the spray 22 because the vibration of the surface 10 imparts a rotational motion to the particles as well as translatory movement to the particles. As the particles rotate and move along the vibrating surface 10, they present an ever changing surface to the wetting agent spray 22 and the pool 16 of wetting agent. In this manner, there is a likelihood that the entire surface of each particle is exposed to the wetting action of the wetting agent.

Although one spray nozzle 20 is shown in FIG. 1, there can be a plurality of such nozzles positioned along the surface 10. The utilization of such a plurality of spray nozzles 20 for spraying the wetting agent upon the particles 12 enables a greater likelihood of coating the entire surface or at least exposing the entire surface to the possibility of coating with the wetting agent.

The vibration of the vibrating surface 10 can also benefit the pool 16 of wetting agent upstream of the barrier 14. For example, if the wetting agent is an emulsion, the constant vibration of the surface 10 can keep the wetting agent in emulsion form and prevent separation of the emulsion. By retaining the wetting agent in emulsion form, the likelihood of the wetting agent within the emulsion encountering a selected component within an ore particle and of coating the particle is increased.

The vibrating surface 10 downstream of the barrier 14 is provided with means for removing and recovering excess wetting agent from the particles 12. The portion 24 of the surface 10 downstream of the barrier 14 can be a screen or a perforated surface. Whether a screen or perforated surface, the portion 24 of the surface 10 is provided with openings 26 that enable excess wetting agent to flow therethrough as a result of the vibration of the vibrating surface. That is, the vibration of the portion 24 of the surface 10 dislodges nonbonded or unreacted wetting agent from the particles. The excess wetting agent falls into a wetting agent receiver 28. The excess wetting agent is then collected in a conditioning agent collector 30. From the conditioning agent collector 30 the wetting agent can be recycled to the conditioning agent reservoir 18 for use in spraying the particles 12 on the surface 10. The recovered excess wetting can also be recycled for forming the pool 16 of wetting agent on the surface 10.

The particles 12 conditioned with the wetting agent, and after having the excess wetting agent removed, are conveyed off the end of the surface 10 for subsequent treatment such as in an optical separation process or froth flotation process.

Any excess wetting agent in the pool 16 which overflows the barrier 14 also is capable of flowing through the openings 26 provided in the portion 24 of the surface 10 downstream of the barrier 14. Such wetting agent can also be recovered in the conditioning agent collector 30. The level of the pool 16 of wetting agent is then maintained at about the height of the barrier 14.

Figure 2:
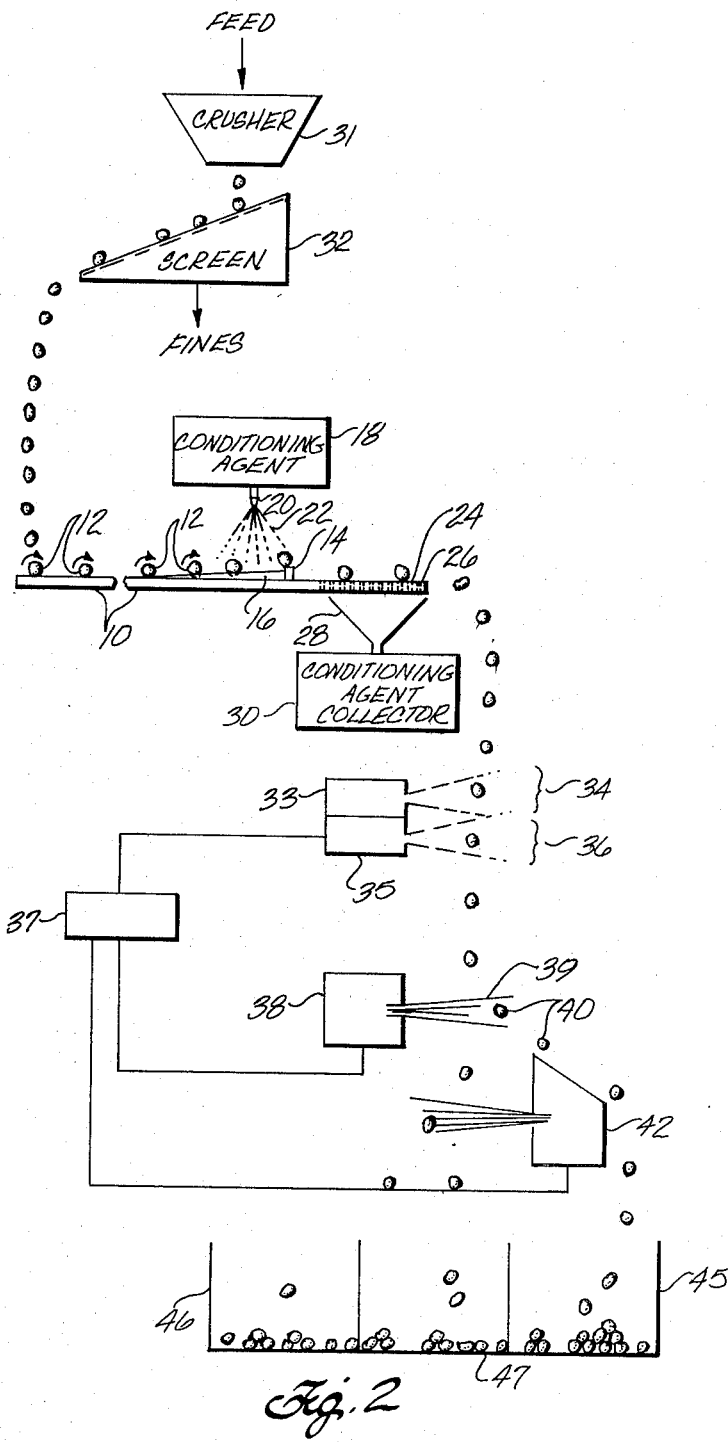
FIG. 2 schematically illustrates an embodiment of apparatus for selectively wetting particles within a mixture with a selective surface-active agent and illustrates the utility of the apparatus within apparatus and a process for the optical separation of particles so wetted into three fractions, each of similar composition.

The utility of the wetting apparatus of the present invention can be readily understood with regard to FIG. 2 wherein a process for the optical separation of a mixture of particles utilizing fluorescence detection is illustrated.

With reference to FIG. 2 an ore is fed to a crusher 31 wherein the ore is crushed to a size from about ¼ to about 8 inches. The crushed ore is then fed onto a screen for providing separation of fines produced in the crushing step. By crushing and screening, the particles are sized to a uniform size from about ¼ to about 8 inches. From the screen the particles are deposited onto a vibrating surface 10. The vibrating surface 10 vibrates in a manner to impart rotational and translatory movement to the particles on the surface. The particles 12 deposited onto the vibrating surface 10 rotate and move generally in one direction, longitudinally, along the vibrating surface. As the particles 12 move along the vibrating surface, they encounter a pool 16 of conditioning agent. Concomitantly with encountering the pool of conditioning agent the particles are sprayed with a spray 22 of conditioning agent. Although not shown, the spray 22 can be upstream of the pool 16. The conditioning agent is sprayed using a spray nozzle 20 which is in fluid communication with a conditioning agent reservoir 18. The conditioning agent is an agent which selectively reacts with a component present in the ore particles. For example, the conditioning agent can be chemically surface reactive with a component in the particles. Such a chemically surface-active agent selectively coats the selected component within the particles to the substantial exclusion of coating portions of the particles that do not contain the selected component. As the particles 12 travel through the pool 16 of conditioning agent, the surface of the particle is constantly exposed to the conditioning agent to enable reaction between the selected component in the particle and the conditioning agent. Additionally, the surface of the particle is exposed to the spray 22 of the conditioning agent also enabling reaction of the conditioning agent with the selected component in the particle.

In the practice of the process in regard to separation based upon differentiating among intensities of fluorescence, the conditioning agent can be a combination of a selective surface-active agent and fluorescent dye. Other optical processes can use a coloring agent such as a fluorescent dye, visible coloring agent and the like.

As the particles 12 travel along the vibrating surface 10 and through the pool 16 of conditioning agent and spray 22 of conditioning agent, it encounters barrier 14. The relative size of the particle and barrier 14 are such that the particle 12 is capable of passing over the barrier 14 because of the translatory movement of the particle imparted by the vibration of the surface 10. The particle, after crossing barrier 14, encounters a portion 24 of the vibrating surface 10 downstream of the barrier 14. The portion 24 of the vibrating surface 10 is provided with a plurality of openings 26 forming a screen. As the vibrating surface 10 continues to vibrate, the excess conditioning agent on the particle 12 that is not chemically reactive with the particle is dislodged from the particle. The excess conditioning agent flows through the openings 26 in the portion 24 of the vibrating surface and is collected by the conditioning agent receiver 28 positioned below the portion 24 of the vibrating surface. The conditioning agent collected in the receiver 28 is transferred to a conditioning agent collector 30. From the conditioning agent collector 30 the conditioning agent can be recycled to the conditioning agent reservoir 18 or to the pool 16. The conditioned particles 12 are conveyed off the end of the vibrating surface 10 in a free-fall path.

The free falling conditioned particles 12 fall through an irradiation zone 34 provided by irradiation source 33. The irradiation source 33 provides actinic radiation to excite and induce fluorescence of the fluorescent dye coating on the particles containing the selected component. In combination with the irradiation zone 34 is a detection zone 36. The detection zone 36, although shown in FIG. 2 below the irradiation zone 34, can be at the same elevation as irradiation zone 34. For example, when a fluorescent dye is used that fluoresces only when simultaneously excited by exposure to actinic radiation, then the detection zone 36 and irradiation zone 34 are at the same elevation.

In the detection zone 36 the intensity of fluorescence of the fluorescent dye coating is detected by detector 35. The detector 35 provides a signal of the intensity of fluorescence to a control unit 37. The control unit 37 is provided with delaying logic, gating logic, and electronic circuitry which is programmable to distinguish among the intensity of fluorescence signals received from the detector 35. The control unit 37 distinguishes among the intensity signals received and provides an activating signal to a first deflector 38, an activating signal to a second deflector 42 or provides no activation signal to either deflector. The signal provided to either deflector 38 or deflector 42 is timed such that the activated deflector provides a fluid stream which encounters the particle that was initially irradiated and whose intensity of fluorescence triggered or initiated the sequence.

A first deflector 38 emits a fluid stream such as air or water toward a particle which initially triggered the sequence. The particle is then deflected from its initial free-fall path to a different pathway. Similarly, a second deflector 42 emits a fluid stream to divert the initial free falling path of a particle to a pathway different from the pathway of particles diverted by the first deflector and different from the initial free falling pathway.

The use of two deflectors provides separation of a mixture of particles into three fractions. For example, if the control unit 37 provides an activation signal to a first deflector upon a high intensity of fluorescence and if fluorescence is directly related to the composition of a selected component within the particle, then those particles separated by the first deflector 38 can comprise a concentrate fraction with regard to the selected component. If the control unit 37 provides an activation signal to the second deflector 42 upon receiving a fluorescence intensity signal which is below the intensity for activating the first deflector, then those particles separated by the second deflector 42 can comprise a middling fraction with regard to the selected component in the particles. If the control unit 37 permits the passage of particles in an undeflected free-fall pathway for particles exhibiting essentially no fluorescence or which fluoresce to a lesser intensity than those separated by deflector 38 and deflector 42, then those particles allowed to free-fall uninterruptedly can comprise a tailing fraction.

The apparatus and method herein provide an efficient means for wetting and conditioning a mixture of particles with a selective wetting agent that reacts and coats a specific component in the mixture of particles. The apparatus and method herein can be utilized in regard to any mixture of particles for which a surface-active agent can be selected. Typical mixtures of particles and surface-active agents that can be used to provide coatings on the particles are disclosed in U.S. patent application Ser. Nos. 897,779, filed Apr. 19, 1978, entitled SEPARATION OF COAL FROM WASTE MATERIAL; 897,947, filed Apr. 19, 1978, entitled METHOD OF SEPARATING A MIXTURE OF ORE PARTICLES; 897,778, filed Apr. 19, 1978, entitled APPARATUS AND METHOD FOR THE CONCENTRATION OF ORE, now abandoned; 897,739, filed Apr. 19, 1978 now U.S. Pat. No. 4,169,045, entitled SEPARATION OF SHALE FROM WASTE MATERIAL, issued as U.S. Pat. No. 4,169,045 on Sept. 25, 1979; all are assigned to the same assignee as this invention and all of the above applications are incorporated herein by this reference. Additionally, filed on even date herewith U.S. patent application Ser. No. 45,185 and entitled PROCESS AND APPARATUS FOR THE SEPARATION OF PARTICLES INTO THREE FRACTIONS OF SIMILAR COMPOSITIONS, also assigned to the same assignee as this invention, is incorporated by this reference.

What is claimed is:

1. Apparatus for the selective wetting of particles within a mixture of particles comprising a horizontally extending surface capable of vibration which vibration imparts uniform translatory movement to particles upon the surface; means for imparting vibration to the surface; a vertically extending barrier upon the surface extending across the surface and at right angle to the direction of translatory movement of particles upon the surface; means for delivering a selective wetting agent toward the surface positioned above the surface; and means along the surface in the direction of translatory movement of particles after the barrier for removing excess selective wetting agent from particles upon the surface.

2. Apparatus as recited in claim 1 wherein the means for removing excess selective wetting agent comprises a screen which coincidentally vibrates with the surface.

3. Apparatus as recited in claim 1 further comprising means for recovering excess selective wetting agent removed from the particles.

4. Apparatus as recited in claim 1 wherein the barrier has a height of about at least one-half of an inch.

5. Apparatus as recited in claim 1 wherein the barrier substantially prevents liquid flow along the surface and has a height relative to the size of particles such that the translatory movement of the particles enables the particles to cross the barrier.

6. A method for selectively wetting particles with a selective wetting agent which agent is selective toward at least one component in the particles, coating such particles in an amount dependent upon the amount of such at least one component, the method comprising the steps of:
  depositing particles to be wetted onto a horizontally extending surface capable of vibration;
  vibrating the surface to impart translatory movement to particles upon the surface;
  spraying the particles as the particles move along the surface with a selective wetting agent directed toward the surface;
  forming a pool of the selective wetting agent upon the surface by providing a barrier upon the surface across the direction of movement of the particles along the surface such that the particles move through the formed pool;
  wetting the particles with the selective wetting agent as the particles move along the surface through the spray and pool of selective wetting agent; and
  removing excess selective wetting agent from the particles.

7. A method as recited in claim 6 wherein the pool of selective wetting agent is formed by the spray of selective wetting agent.

8. A method as recited in claim 6 wherein the surface is vibrated providing a translatory movement to the particles and a rotational movement to the particles.

9. A method as recited in claim 6 wherein excess selective wetting agent is removed from the particles by conveying the particles across a vibrating screen of sufficient mesh to prevent the particles from falling therethrough but allow the passage of excess selective wetting agent.

10. A method as recited in claim 6 wherein excess wetting agent is recovered and recycled for spraying onto the particles.

11. A method as recited in claim 6 wherein excess wetting agent is recovered and recycled for forming the pool of selective wetting agent.

12. In a method for the separation of a mixture of particles into at least two fractions of similar composition with regard to a selected component present in the particles by the steps of conditioning the mixture of particles to be separated with a conditioning agent comprising a selective surface-active agent in combination with a fluorescent dye for providing a coating of the surface-active agent and fluorescent dye on particles containing selected component in an amount relative to the amount of selected component in each particle, irradiating the conditioned particles to excite and induce fluorescence of the fluorescent dye coating on the particles and separating the particles into different fractions by distinguishing among the intensities of fluorescence exhibited by the particles, the improvement comprising conditioning the particles by the steps of:
  depositing the particles to be conditioned onto a horizontally extending surface capable of vibration;
  vibrating the surface to impart translatory movement to particles upon the surface;
  spraying the particles as the particles move along the surface with a surface-active agent and fluorescent dye spray directed toward the surface;
  forming a pool of the surface-active agent and fluorescent dye upon the surface by providing a barrier upon the surface extending across the direction of movement of the particles along the surface such that the particles move through the formed pool;
  coating the particles with the surface-active agent and fluorescent dye as the particles move along the surface through the spray and pool of surface-active agent and fluorescent dye; and
  removing excess surface active agent and fluorescent dye from the particles.

* * * * *

UNITED STATES PATENT AND TRADEMARK OFFICE
CERTIFICATE OF CORRECTION

PATENT NO. : 4,241,102
DATED : December 23, 1980
INVENTOR(S) : John R. McKinley and John G. Roeschlaub It is certified that error appears in the above—identified patent and that said Letters Patent is hereby corrected as shown below:

Column 3, line 7, delete the word "the" second occurrence.
Column 8, line 63, after "1978" delete "now U.S. Pat. No. 4,169,045".
Column 8, line 65, after "1979;" insert -- and 897,780, filed April 19, 1978, entitled SEPARATION OF MAGNESITE FROM ORES WHICH ALSO CONTAIN CALCITE OR DOLOMITE; --.
Column 9, lines 5 and 6, after the word "incorporated" insert -- herein --.

Signed and Sealed this

Fifth Day of May 1981

[SEAL]

Attest:

RENE D. TEGTMEYER

*Attesting Officer*  *Acting Commissioner of Patents and Trademarks*